(12) United States Patent
Furukoshi

(10) Patent No.: US 7,414,694 B2
(45) Date of Patent: Aug. 19, 2008

(54) LIQUID CRYSTAL DISPLAY DEVICE

(75) Inventor: Yasutake Furukoshi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 174 days.

(21) Appl. No.: 11/025,869

(22) Filed: Dec. 29, 2004

(65) Prior Publication Data
US 2006/0066800 A1    Mar. 30, 2006

(30) Foreign Application Priority Data
Sep. 28, 2004    (JP)    ............... 2004-282416

(51) Int. Cl.
*G02F 1/1345* (2006.01)
(52) U.S. Cl. ..................... 349/151; 349/152
(58) Field of Classification Search ............ 349/150, 349/149, 151, 152
See application file for complete search history.

(56) References Cited

U.S. PATENT DOCUMENTS

| 5,029,984 | A | * | 7/1991 | Adachi et al. ............... 349/150 |
| 5,737,053 | A | | 4/1998 | Yomogihara et al. |
| 6,407,795 | B1 | * | 6/2002 | Kamizono et al. ........... 349/149 |
| 6,501,525 | B2 | * | 12/2002 | Huang et al. ................. 349/150 |
| 7,002,812 | B2 | * | 2/2006 | Sakaki ......................... 361/803 |

FOREIGN PATENT DOCUMENTS

| JP | 9-127540 | 5/1997 |
| KR | 10-0242741 | 11/1999 |

* cited by examiner

*Primary Examiner*—David Nelms
*Assistant Examiner*—David Y. Chung
(74) *Attorney, Agent, or Firm*—Greer, Burns & Crain, Ltd.

(57) ABSTRACT

A plurality of gate driver boards are bonded to a first side of a TFT substrate, and a wiring board made of a flexible printed wiring board is bonded between the gate driver boards. Then, a wiring disposed on the wiring board provides connection between adjacent gate driver boards. In the same manner, a plurality of data driver boards are bonded to a second side of the TFT substrate, and a wiring board made of a flexible printed wiring board is bonded between the data driver boards. Then, a wiring disposed on the wiring board provides connection between adjacent data driver boards.

8 Claims, 4 Drawing Sheets

LIQUID CRYSTAL DISPLAY DEVICE

CROSS-REFERENCE TO RELATED APPLICATIONS

This application is based on and claims priority of Japanese Patent Application No. 2004-282416 filed on Sep. 28, 2004, the entire contents of which are being incorporated herein by reference.

BACKGROUND OF THE INVENTION

1. Field of the Invention

The invention relates to an active matrix liquid crystal display device and more particularly to a liquid crystal display device suitable for a larger screen.

2. Description of the Prior Art

Liquid crystal display devices have the advantages of being thin and lightweight and also allowing low-voltage drive and thus low power consumption. Thus, liquid crystal display devices are used in various types of electronic equipment, such as televisions, PCs (personal computers), PDAs (personal digital assistants), and mobile telephones. In particular, an active matrix liquid crystal display device, which includes a TFT (thin film transistor) which is provided for each picture element (or subpixel) so as to act as a switching element, has high driving capabilities and thus exhibits excellent display characteristics comparable to those of a CRT (cathode ray tube). Thus, active matrix liquid crystal display devices have come into wide use in the fields where CRTs have been heretofore used, such as desktop PCs and televisions.

Generally, a liquid crystal display device comprises two transparent substrates made of thin glass sheets, and liquid crystal sealed in between the substrates. One substrate includes a picture element electrode and a TFT, which are provided for each picture element. The other substrate includes a color filter to be faced with each picture element electrode, and a common electrode common to every picture element. Hereinafter, the substrate having the picture element electrodes and the TFTs will be called a "TFT substrate", and the substrate to be faced with the TFT substrate will be called an "opposite substrate". A structure formed of the TFT substrate, the opposite substrate, and liquid crystal sealed in between the substrates is herein referred to as a "liquid crystal panel".

FIG. 1 is a plan view showing a TFT substrate of a conventional liquid crystal display device.

On a TFT substrate 1, there are disposed a plurality of gate bus lines 3 extending horizontally, and a plurality of data bus lines 5 extending vertically. The gate bus lines 3 and the data bus lines 5 partition the TFT substrate 1 into rectangular regions, which are picture element regions. In each picture element region, there are disposed a TFT 9 which acts as a switching element, and a picture element electrode 8. The gate, source, and drain of the TFT 9 are connected to the gate bus line 3, the data bus line 5, and the picture element electrode 8, respectively. In the case of a transmissive liquid crystal display device, the picture element electrode 8 is made of a transparent electrode such as ITO (Indium-Tin Oxide). In the case of a reflective liquid crystal display device, the picture element electrode 8 is made of any of Al (aluminum) alloys, or the like.

A plurality of gate driver boards 2b are bonded to a first side of the TFT substrate 1 (e.g., the left side thereof in FIG. 1) with ACFs (anisotropic conductive films). The gate driver boards 2b are each made of a flexible printed wiring board, which is formed of a resin film, such as polyimide, and copper foil bonded to the resin film. A gate driver 2a (i.e., a gate driving IC (integrated circuit)) is mounted on each gate driver board 2b. The gate driver 2a has a plurality of output terminals, each of which is electrically connected to the corresponding gate bus line 3.

In the same manner as described above, a plurality of data driver boards 4b, each of which is made of a flexible printed wiring board, are bonded to a second side of the TFT substrate 1 (e.g., the lower side thereof in FIG. 1) with ACFs. A data driver 4a (i.e., an IC for supplying display data) is mounted on each data driver board 4b. The data driver 4a has a plurality of output terminals, each of which is electrically connected to the corresponding data bus line 5.

An input part 10 to be connected to a control circuit board (not shown) is disposed on the TFT substrate 1. Laid on the TFT substrate 1 are wirings 6 which provide connections between the input part 10 and the gate driver boards 2b or between the adjacent gate driver boards 2b, and wirings 7 which provide connections between the input part 10 and the data driver boards 4b or between the adjacent data driver boards 4b. Typically, the wirings 6 and 7 on the TFT substrate 1 are formed simultaneously with the gate bus lines 3 or the data bus lines 5, and the wirings 6 and 7 are each made of, for example, a metal film having a three-layer Ti—Al—Ti structure in which titanium, aluminum, and titanium are stacked in sequence.

In the liquid crystal display device configured as mentioned above, the control circuit board supplies display data, a data clock signal, a gate clock signal, a timing signal, and a predetermined voltage (hereinafter referred to as a "power supply voltage") to the TFT substrate 1 via the input part 10. The display data, the data clock signal, the timing signal, and the power supply voltage are supplied to each data driver 4a via the wirings 7 disposed on the edge of the TFT substrate 1. The gate clock signal, the timing signal, and the power supply voltage are supplied to each gate driver 2a via the wirings 6 disposed on the edge of the TFT substrate 1.

The data driver 4a outputs the display data to the data bus lines 5 in accordance with the timing in synchronization with the data clock signal within a horizontal synchronization interval. On the other hand, the gate driver 2a outputs a scan signal to the gate bus lines 3 in sequence in accordance with the timing in synchronization with the gate clock signal within a vertical synchronization interval. When the gate bus line 3 receives the scan signal, the TFT 9 for a picture element connected to the gate bus line 3 is turned on, so that the display data supplied to the data bus line 5 is written on the picture element electrode 8. This causes a change in the orientation of liquid crystal molecules in the picture element, thus causing a change in light transmittance of the picture element. Thus, the display data is written on each picture element within a vertical synchronization interval, so that a desired image is displayed on the liquid crystal display device.

Another prior art is disclosed in patent literature 1 (Japanese Unexamined Patent Application Publication No. Hei 09-127540).

In the view of the inventors, the conventional liquid crystal display device, as mentioned above and shown in FIG. 1, has problems as given below. In recent years, there have been demands for larger-sized liquid crystal display devices. However, a larger-sized liquid crystal display device leads to longer wirings 6 and 7 on the substrate 1 and thus to higher wiring resistance. This may cause a relatively significant voltage drop in the wirings 6 and 7, thus causing, for example, variations in color or brightness between picture elements connected to the data bus lines 5 located near the input part 10 and picture elements connected to the data bus lines 5 located far from the input part 10, even though the same display data is supplied to the data bus lines 5. In extreme cases, such an increase in wiring resistance may also make it impossible to supply a predetermined voltage to the gate drivers 2a or the data drivers 4a, thus causing marked deterioration in image display quality.

Patent literature 1, the above publication No. Hei 09-127540, discloses a liquid crystal display device including a TFT substrate having driver ICs mounted thereon, wherein the driver ICs are connected through flexible printed wiring boards (FPC). However, the liquid crystal display device has a disadvantage as given below. Upsizing the liquid crystal display device leads to an increase in the size of the flexible printed wiring board, thus rendering it difficult for an OLB (outer lead bonding) apparatus to bond the flexible printed wiring board to the TFT substrate.

SUMMARY OF THE INVENTION

It is therefore an object of the invention to provide a liquid crystal display device which is capable of preventing unevenness in color or brightness resulting from wiring resistance between an input part and driver boards and between the driver boards, thereby achieving good display quality, even when a panel is of a larger size.

To solve the above problems, a liquid crystal display device of the invention comprising a pair of substrates and liquid crystal sealed in between the substrates, which displays an image by driving a matrix of a plurality of picture elements, includes: a plurality of driver boards bonded to one of the substrates, the driver boards each having a driver mounted thereon, the driver serving to drive the picture element; and a wiring board bonded to the one substrate in a region between the driver boards, the wiring board having a wiring disposed thereon, the wiring serving to provide electrical connection between two adjacent driver boards. Generally, the wiring which is to be formed on an edge of one substrate (i.e., a TFT substrate) constituting a liquid crystal panel so as to provide connection between the driver boards is formed simultaneously with a gate bus line or a data bus line. Thus, the wiring on the edge of the TFT substrate is limited in thickness or material, and it is therefore difficult to use a low-resistance material, such as copper. The wiring is also limited in width in terms of process, and it is thus difficult to form the wiring having such a great width that wiring resistance is negligible.

Therefore, in the liquid crystal display device of the invention, the wiring board having the wiring disposed thereon is bonded to the edge of the one substrate in the region between the driver boards, and the wiring serves to provide electrical connection between two adjacent driver boards. A general flexible printed wiring board, which is formed of a resin film, such as polyimide, and copper foil bonded to the resin film, may be used as the wiring board. As described above, the wiring board is bonded in the region between two driver boards, and the wiring on the wiring board provides electrical connection between the two driver boards. Thus, the liquid crystal display device of the invention enables a sufficiently substantial reduction in wiring resistance. Accordingly, the liquid crystal display device of the invention can prevent unevenness in color or brightness resulting from a voltage drop due to wiring resistance, and thereby achieving good display quality.

DESCRIPTION OF THE PREFERRED EMBODIMENTS

An embodiment of the invention will be described below with reference to the accompanying drawings.

Figure 1:
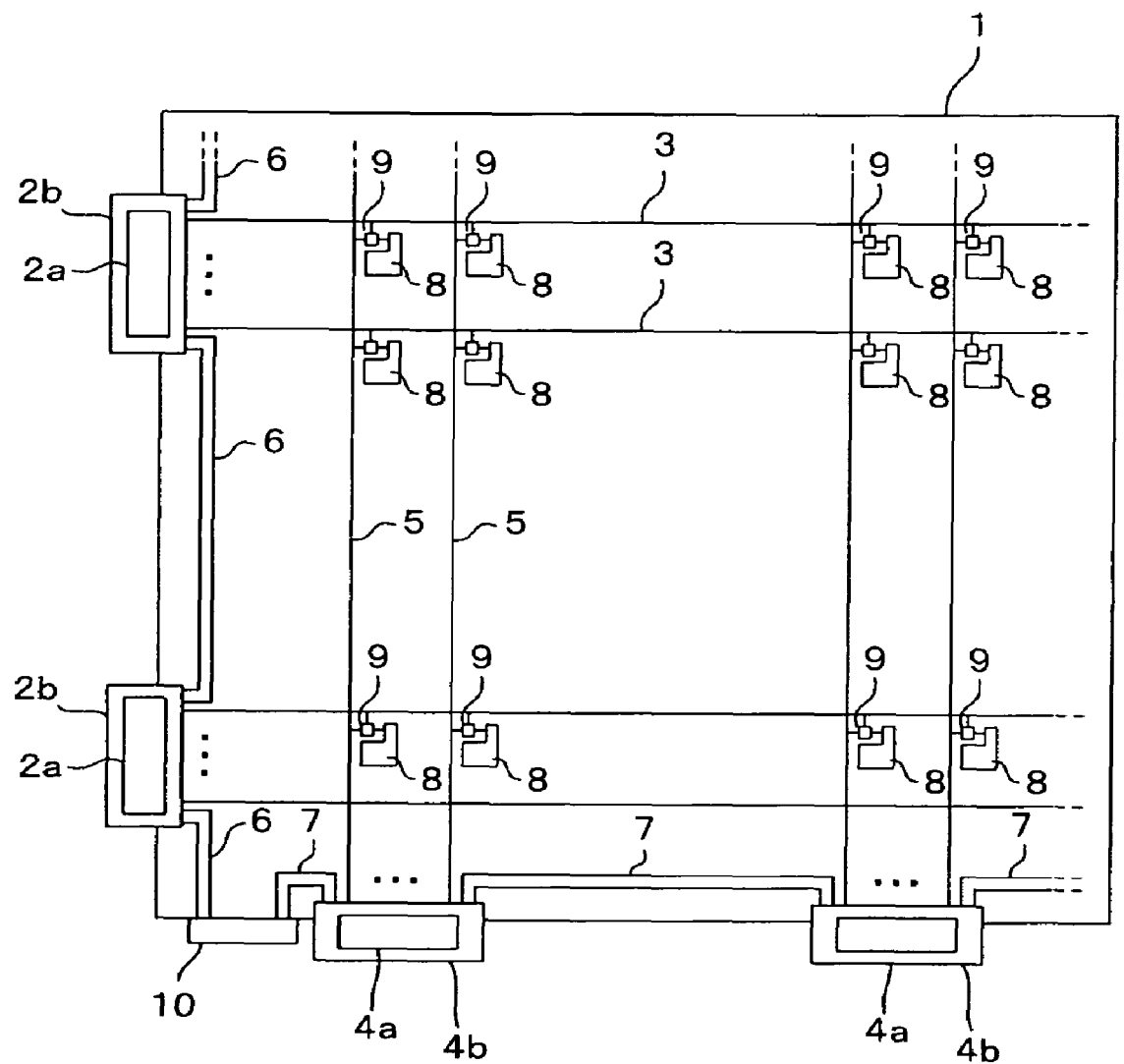
FIG. 1 is a plan view showing a TFT substrate of a conventional liquid crystal display device.
Figure 2:
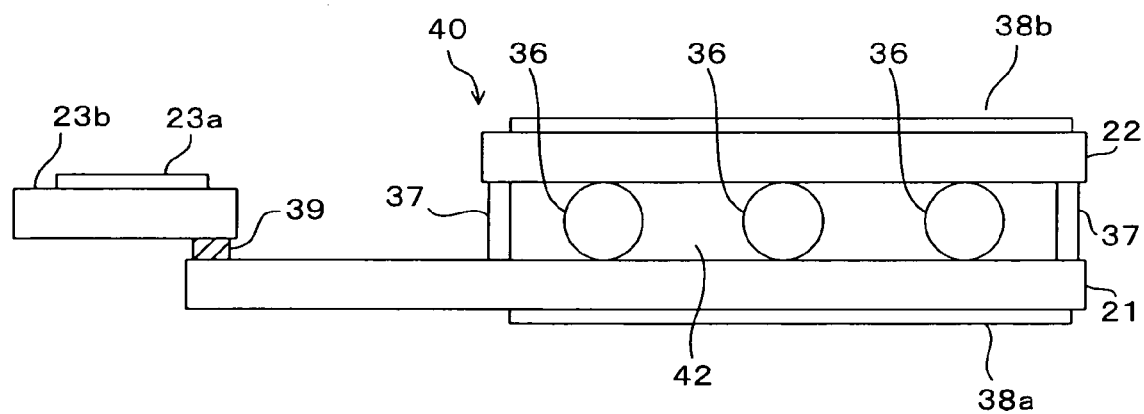
FIG. 2 is a schematic cross-sectional view showing a liquid crystal display device according to an embodiment of the invention.

FIG. 2 is a schematic cross-sectional view showing a liquid crystal display device. according to the embodiment of the invention. Incidentally, the description is given with regard to the embodiment of the invention as applied to a transmissive liquid crystal display device.

A liquid crystal panel 40 comprises a TFT substrate 21 and an opposite substrate 22 which are disposed with spacers 36 in between and are bonded with a sealing compound 37, and liquid crystal 42 sealed in between the TFT substrate 21 and the opposite substrate 22. The TFT substrate 21 is slightly larger than the opposite substrate 22 and partly extends beyond the opposite substrate 22. Gate driver boards 23b each having a gate driver 23a mounted thereon, and other components are connected to the extending part of the TFT substrate 21 by the use of ACFs 39 (anisotropic conductive films), as will be described later.

The TFT substrate 21 includes a picture element electrode and a TFT, which are provided for each picture element region, as will be described later. The opposite substrate 22 includes a color filter to be faced with each picture element electrode, and a common electrode common to every picture element. The color filters are provided for three colors, namely, red, green, and blue. One of the red, green, and blue color filters is located facing each picture element electrode. A color unit (i.e., a pixel) is composed of three picture elements, namely, red, green, and blue picture elements, which are adjacent to each other.

Sheet polarizers 38a and 38b which form a pair are disposed on the bottom and top surfaces of the liquid crystal panel 40, respectively, with their absorption axes perpendicular to each other. A backlight (not shown) is disposed close to the bottom surface of the liquid crystal panel 40.

Figure 3:
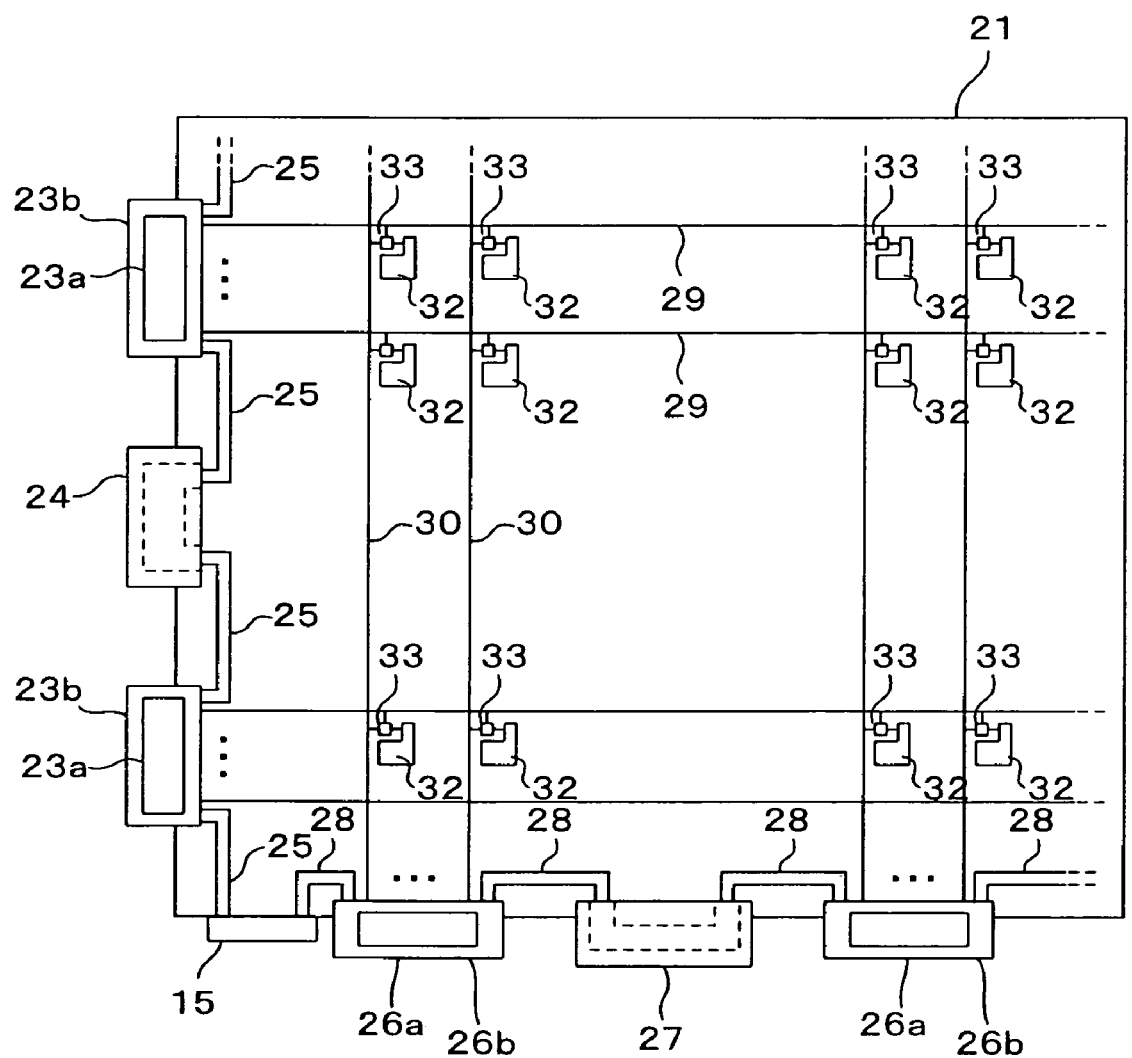
FIG. 3 is a plan view showing a TFT substrate of the liquid crystal display device according to the embodiment.

FIG. 3 is a plan view showing the TFT substrate 21 of the liquid crystal display device according to the embodiment as mentioned above. On the TFT substrate 21, there are disposed a plurality of gate bus lines 29 extending horizontally, and a plurality of data bus lines 30 extending vertically. The gate bus line 29 is made of, for example, a Cr (chromium) film, or a stacked Al—Ti film in which aluminum and titanium are stacked in sequence. The data bus line 30 is made of, for example, a stacked Ti—Al—Ti film in which titanium, aluminum, and titanium are stacked in sequence. An insulating film is formed between the gate bus line 29 and the data bus line 30 so as to provide electrical isolation between the gate bus line 29 and the data bus line 30.

Picture element regions are partitioned into rectangular regions by the gate bus lines 29 and the data bus lines 30. In each picture element region, there are disposed a picture element electrode 32 made of a transparent conductor such as ITO, and a TFT 33 which functions as a switching element. The gate, drain, and source of the TFT 33 are connected to the gate bus line 29, the data bus line 30, and the picture element electrode 32, respectively. An area having a matrix of picture elements each comprising the picture element electrode 32 is a display area. As shown in FIG. 2, the sealing compound 37 is applied to the TFT substrate 21 around the display area so as to bond the TFT substrate 21 to the opposite substrate 22.

An input part 15 to be connected to a control circuit board to be described later is disposed on the TFT substrate 21. A plurality of gate driver boards 23b and a plurality of wiring boards 24, which alternate with each other, are bonded to a first side of the TFT substrate 21 (e.g., the left side thereof in FIG. 3). Wirings 25 are laid on the TFT substrate 21 so as to provide electrical connections between the input part 15 and the gate driver board 23b closest to the input part 15 and between the gate driver boards 23b and the wiring boards 24 adjacent to the gate driver boards 23b.

The gate driver board 23b is made of a flexible printed wiring board, which is formed of a resin film, such as polyimide, and copper foil bonded to the resin film. The gate driver 23a (i.e., a gate driving IC) is mounted on the gate driver board 23b. The gate driver 23a has a plurality of output terminals, each of which is electrically connected to the corresponding gate bus line 29 through the ACF.

The wiring board 24 is made of a flexible printed wiring board. A wiring is laid on the wiring board 24 so as to provide electrical connection between two adjacent gate driver boards 23b. More specifically, the two adjacent gate driver boards 23b are electrically connected to each other via the wiring 25 on the TFT substrate 21 and the wiring on the wiring board 24. The wiring on the wiring board 24 is coated with an insulating film. The wiring has terminals on both its ends in order that the terminals are bonded to the TFT substrate 21 through the ACF.

A plurality of data driver boards 26b and a plurality of wiring boards 27, which alternate with each other, are bonded to a second side of the TFT substrate 21 (e.g., the lower side thereof in FIG. 3). Wirings 28 are laid on the TFT substrate 21 so as to provide electrical connections between the input part 15 and the data driver board 26b closest to the input part 15 and between the data driver boards 26b and the wiring boards 27 adjacent to the data driver boards 26b.

The data driver board 26b is made of a flexible printed wiring board. A data driver 26a (i.e., an IC for supplying display data) is mounted on the data driver board 26b. The data driver 26a has a plurality of output terminals, each of which is electrically connected to the corresponding data bus line 30 through the ACF.

The wiring board 27 is made of a flexible printed wiring board. A wiring is laid on the wiring board 27 so as to provide electrical connection between two adjacent data driver boards 26b. More specifically, the two adjacent data driver boards 26b are electrically connected to each other via the wiring 28 on the TFT substrate 21 and the wiring on the wiring board 27. The wiring on the wiring board 27 is coated with an insulating film. The wiring has terminals on both its ends in order that the terminals are bonded to the TFT substrate 21 through the ACF.

Figure 4:
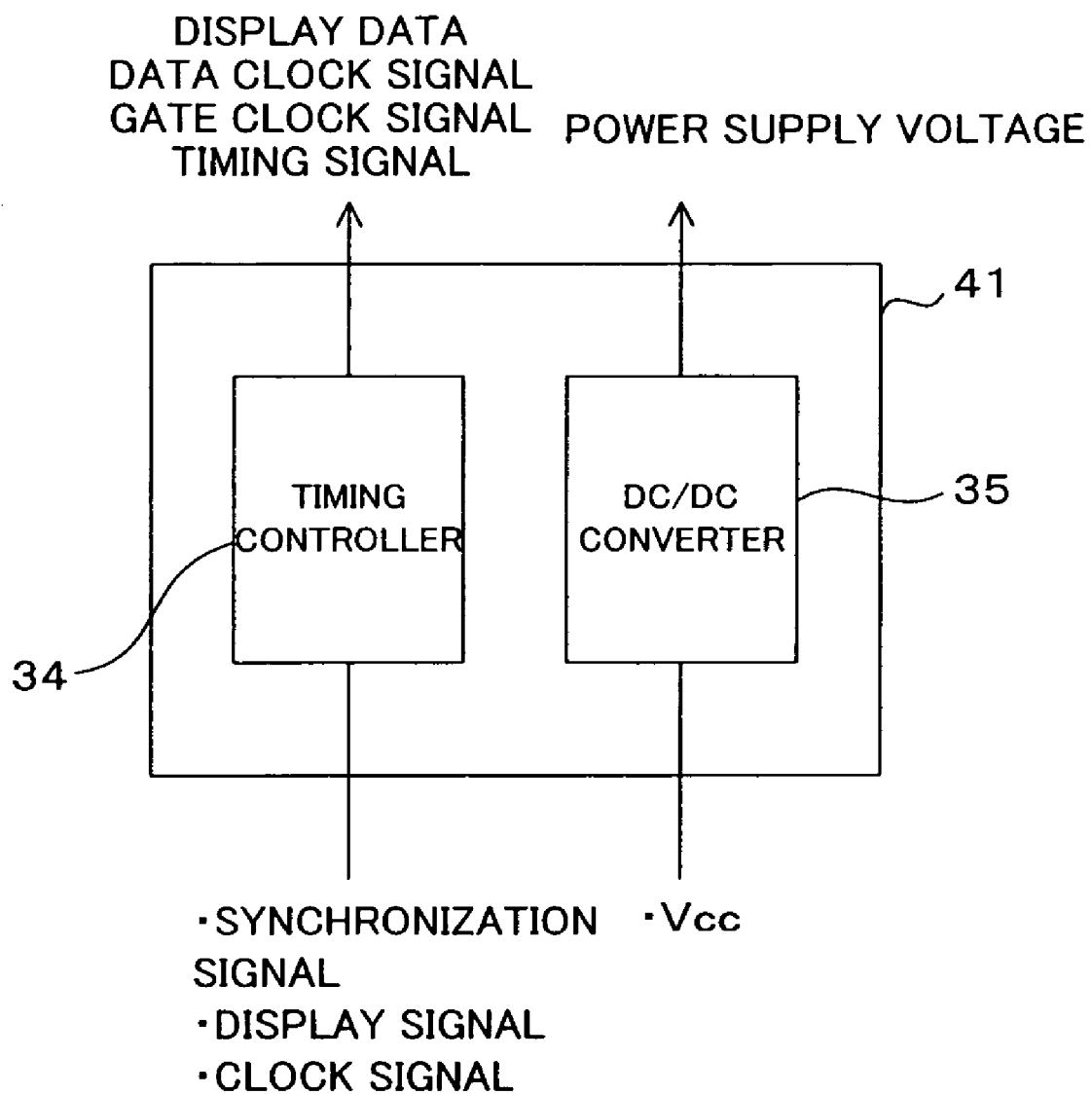
FIG. 4 is a block diagram showing a control circuit board to be connected to the TFT substrate via an input part.

FIG. 4 is a block diagram showing a control circuit board 41 to be connected to the TFT substrate 21 via the input part 15. A timing controller 34 and a DC/DC converter 35 are mounted on the control circuit board 41. Upon receipt of input of signals, such as a display signal, a synchronization signal, and a clock signal, from external equipment (not shown) such as a computer, the timing controller 34 generates display data, a gate clock signal, a data clock signal, and a timing signal from the input signals, and outputs the generated data and signals. Upon receipt of input of a predetermined voltage Vcc from a power supply (not shown), the DC/DC converter 35 generates a voltage (e.g., +3.3 V) for driving the gate driver 23a and the data driver 26a, a voltage (e.g., −5 V or +30 V) for turning on or off the TFT 33, or a voltage (e.g., +12 V) for converting digital display data into analog display data.

The gate clock signal, the timing signal, and the power supply voltage outputted by the control circuit board 41 are supplied to the gate driver 23a on each gate driver board 23b via the wiring 25 on the TFT substrate 21 and the wiring board 24. In the same manner, the display data, the data clock signal, the timing signal, and the power supply voltage outputted by the control circuit board 41 are supplied to the data driver 26a on each data driver board 26b via the wiring 28 on the TFT substrate 21 and the wiring board 27.

In the liquid crystal display device according to the embodiment configured as mentioned above, the control circuit board 41 supplies the display data, the data clock signal, the gate clock signal, the timing signal, and the power supply voltage to the TFT substrate 21 via the input part 15. The display data, the data clock signal, the timing signal, and the power supply voltage are supplied to each data driver 26a via the wiring 28 on the edge of the TFT substrate 21 and the wiring board 27. The gate clock signal, the timing signal, and the power supply voltage are supplied to each gate driver 23a via the wiring 25 on the edge of the TFT substrate 21 and the wiring board 24.

The data driver 26a outputs the display data to the data bus lines 30 in accordance with the timing in synchronization with the data clock signal within a horizontal synchronization interval. On the other hand, the gate driver 23a outputs a scan signal to the gate bus lines 29 in sequence in accordance with the timing in synchronization with the gate clock signal within a vertical synchronization interval. When the gate bus line 29 receives the scan signal, the TFT 33 for a picture element connected to the gate bus line 29 is turned on, so that the display data supplied to the data bus line 30 is written on the picture element electrode 32. This causes a change in the orientation of liquid crystal molecules in the picture element, thus causing a change in light transmittance of the picture element. Thus, the display data is written on each picture element within a vertical synchronization interval, so that a desired image is displayed on the liquid crystal display device.

The wirings 25 and 28 on the TFT substrate 21 are each made of, for example, a metal film having a three-layer Ti—Al—Ti structure and each have a thickness of about 0.1 to 0.3 μm and a width of the order of several micrometers to 100 micrometers. It is difficult to change the material or thickness of the wirings 25 and 28, because these wirings are formed simultaneously with the gate bus lines 29 or the data bus lines 30. On the other hand, the wirings on the wiring boards 24 and 27 are made of copper having lower resistance than Ti and Al, and moreover, these wirings are each as thick as 18 to 25 μm and as wide as 100 μm or more.

In the liquid crystal display device of the embodiment as described above, the wirings 25 and 28 having a short length are formed on the TFT substrate 21, but the wiring boards 24 and 27 are bonded to the TFT substrate 21 so as to reduce wiring resistance between the gate driver boards 23b and wiring resistance between the data driver boards 26b. For example, when the wirings on the wiring boards 24 and 27 each have a length of 35 to 48 mm, the wiring resistance of the wiring boards 24 and 27 is extremely low, as low as 0.1 to 0.2 Ω. On the other hand, when wirings having the same length and the three-layer Ti—Al—Ti structure are formed on the TFT substrate 21, the wiring resistance is 10 to 20 Ω. In other words, the liquid crystal display device of the embodiment can reduce the resistance value between the driver boards to about one tenth, as compared to the conventional liquid crystal display devices.

In the liquid crystal display device of the embodiment as described above, the copper wirings on the wiring boards 24 and 27 provide electrical connection between the driver boards 23b and electrical connection between the driver boards 26b, respectively, thereby preventing a voltage drop due to the wiring resistance between the driver boards 23b and the wiring resistance between the driver boards 26b. Therefore, the liquid crystal display device of the embodiment can avoid the occurrence of unevenness in brightness and color and thus achieve high-quality image display, even when the liquid crystal panel is of a larger size.

The wiring boards 24 and 27 are relatively small in size so as to be mounted between the gate driver boards 23b and between the data driver boards 26b, respectively. Thus, an OLB apparatus can be used to bond the wiring boards 24 and 27 to the TFT substrate 21, as in the case of the gate driver board 23b and the data driver board 26b. This allows bonding the wiring boards 24 and 27 to the TFT substrate 21 simultaneously with the driver boards 23b and 26b and thus facilitates manufacturing, and further allows realizing high accuracy of mounting position and low connection resistance.

Although the description has been given with regard to the embodiment of the invention as applied to the transmissive liquid crystal display device, the invention is not limited to this embodiment. The invention may be applied to a reflective liquid crystal display device or a semi-transparent liquid crystal display device.

What is claimed is:

1. A liquid crystal display device including a pair of substrates and liquid crystal sealed in between the substrates, and displaying an image by driving a matrix of a plurality of picture elements, comprising:
    a plurality of driver boards bonded to one of the substrates, each of the plurality of driver boards having a driver mounted thereon, the driver serving to drive at least one of the plurality of picture elements; and
    a discrete wiring board bonded to the one of the substrates entirely in a region between two adjacent ones of the plurality of driver boards, the wiring board having a wiring disposed thereon, the wiring serving to provide a sequential electrical connection between the two adjacent driver boards;
    wherein each of the plurality of driver boards and the discrete wiring board are bonded alternately with each other to the one of the substrates.

2. A liquid crystal display device according to claim 1, wherein the wiring board is made of a flexible printed wiring board which is formed of a resin film and copper foil bonded to the resin film.

3. A liquid crystal display device according to claim 1, wherein the wiring supplies a power supply voltage to the driver board.

4. A liquid crystal display device according to claim 1, wherein the wiring supplies a clock signal to the driver board.

5. A liquid crystal display device according to claim 1, wherein the wiring supplies display data to the driver board.

6. A liquid crystal display device including first and second substrates and liquid crystal sealed in between the first and second substrates, and displaying an image by driving a matrix of a plurality of picture elements, comprising:
    a picture element electrode and a thin film transistor formed on the first substrate and which together constitute one of the plurality of picture elements;
    a plurality of gate bus lines formed on the first substrate, each extending horizontally and connected to a gate of a thin film transistor of one of the plurality of picture elements;
    a plurality of data bus lines formed on the first substrate, each extending vertically and connected to a drain of a thin film transistor of one of the plurality of picture elements;
    a plurality of gate driver boards bonded to an edge of the first substrate, each of the plurality of gate driver boards having a gate driver mounted thereon, the gate driver serving to supply a scan signal to a corresponding gate bus line; and
    a discrete wiring board bonded to the first substrate entirely in a region between two adjacent ones of the plurality of gate driver boards, the wiring board having a wiring disposed thereon, the wiring serving to provide a sequential electrical connection between the two adjacent gate driver boards,
    wherein each of the plurality of gate driver boards and the discrete wiring board are bonded alternately with each other to the one of the substrates.

7. A liquid crystal display device including first and second substrates and liquid crystal sealed in between the first and second substrates, and displaying an image by driving a matrix of a plurality of picture elements, comprising:
    a picture element electrode and a thin film transistor formed on the first substrate and which together constitute one of the plurality of picture elements;
    a plurality of gate bus lines formed on the first substrate, each extending horizontally and connected to a gate of a thin film transistor of one of the plurality of picture elements;
    a plurality of data bus lines formed on the first substrate, each extending vertically and connected to a drain of a thin film transistor of one of the plurality of picture elements;
    a plurality of data driver boards bonded to an edge of the first substrate, each of the plurality of data driver boards having a data driver mounted thereon, the data driver serving to supply display data to a corresponding data bus line; and
    a discrete wiring board bonded to the first substrate in a region entirely between two adjacent ones of the plurality of data driver boards, the discrete wiring board having a wiring disposed thereon, the wiring serving to provide a sequential electrical connection between the two adjacent data driver boards,
    wherein each of the plurality of data driver boards and the discrete wiring board are bonded alternately with each other to the one of the substrates.

8. A liquid crystal display device including first and second substrates and liquid crystal sealed in between the first and second substrates, and displaying an image by driving a matrix of a plurality of picture elements, comprising:
    a picture element electrode and a thin film transistor formed on the first substrate and which together constitute one of the plurality of picture elements;
    a plurality of gate bus lines formed on the first substrate, each extending horizontally and connected to a gate of a thin film transistor of one of the plurality of picture elements;
    a plurality of data bus lines formed on the first substrate, each extending vertically and connected to a drain of a thin film transistor of one of the plurality of picture elements;
    a plurality of gate driver boards bonded to a first edge of the first substrate, each of the plurality of gate driver boards having a gate driver mounted thereon, the gate driver serving to supply a scan signal to a corresponding gate bus line;

a first discrete wiring board bonded to the first substrate entirely in a region between two adjacent ones of the plurality of gate driver boards, the first discrete wiring board having a wiring disposed thereon, the wiring serving to provide a sequential electrical connection between the two adjacent gate driver boards;

a plurality of data driver boards bonded to a second edge of the first substrate, each of the plurality of data driver boards having a data driver mounted thereon, the data driver serving to supply display data to a corresponding data bus line; and a second discrete wiring board bonded to the first substrate entirely in a region between two adjacent ones of the plurality of data driver boards, the second discrete wiring board having a wiring disposed thereon, the wiring serving to provide a sequential electrical connection between the two adjacent data driver boards, wherein each of the plurality of gate and data driver boards and the first and second discrete wiring boards are bonded alternately with each other to the one of the substrates.

* * * * *